United States Patent
Tijink et al.

(10) Patent No.: US 11,475,764 B2
(45) Date of Patent: Oct. 18, 2022

(54) SERVICE STATION FOR AN INTELLIGENT TRANSPORTATION SYSTEM

(71) Applicant: Kapsch TrafficCom AG, Vienna (AT)

(72) Inventors: Jasja Tijink, Breitenfurt (AT); Dieter Smely, Schwechat (AT)

(73) Assignee: Kapsch TrafficCom AG, Vienna (AT)

( * ) Notice: Subject to any disclaimer, the term of this patent is extended or adjusted under 35 U.S.C. 154(b) by 172 days.

(21) Appl. No.: 16/990,513

(22) Filed: Aug. 11, 2020

(65) Prior Publication Data

US 2021/0056839 A1 Feb. 25, 2021

(30) Foreign Application Priority Data

Aug. 22, 2019 (EP) .................................... 19192996

(51) Int. Cl.
*G08G 1/01* (2006.01)
*G08G 1/052* (2006.01)
(Continued)

(52) U.S. Cl.
CPC ........... *G08G 1/0116* (2013.01); *G08G 1/052* (2013.01); *G08G 1/056* (2013.01);
(Continued)

(58) Field of Classification Search
CPC ...... G08G 1/0116; G08G 1/052; G08G 1/056; G08G 1/096783; H04L 51/20; H04W 4/44; H04W 4/40
See application file for complete search history.

(56) References Cited

U.S. PATENT DOCUMENTS

2010/0214085 A1\* 8/2010 Avery .................... G08G 1/161
340/435
2013/0083679 A1\* 4/2013 Krishnaswamy ....... H04W 4/44
370/252
(Continued)

FOREIGN PATENT DOCUMENTS

CN 109389847 A \* 2/2019 .......... H04W 72/048
CN 109600715 A \* 4/2019 ............... H01Q 3/26
(Continued)

OTHER PUBLICATIONS

Extended European Search Report received for European Patent Application No. 19192996.7, dated Dec. 10, 2019, 11 pages.
(Continued)

*Primary Examiner* — Dale W Hilgendorf
(74) *Attorney, Agent, or Firm* — Fiala & Weaver P.L.L.C.

(57) ABSTRACT

The disclosed subject matter relates to an Intelligent Transportation System (ITS) service station, comprising: a receiver configured to receive, from one or more sensors, information on a set of road users perceived by the sensors, wherein said road user information includes, for each road user in the set, a respective geographical position determined by the sensors; a controller connected to the receiver and configured to determine, on the basis of said geographical positions, whether a subset of road users in said set meets a predetermined criterion of mutual proximity; and a transmitter connected to the controller and configured to transmit, when said subset comprises two or more road users, a service message indicative of said subset.

17 Claims, 2 Drawing Sheets

Figure 1:
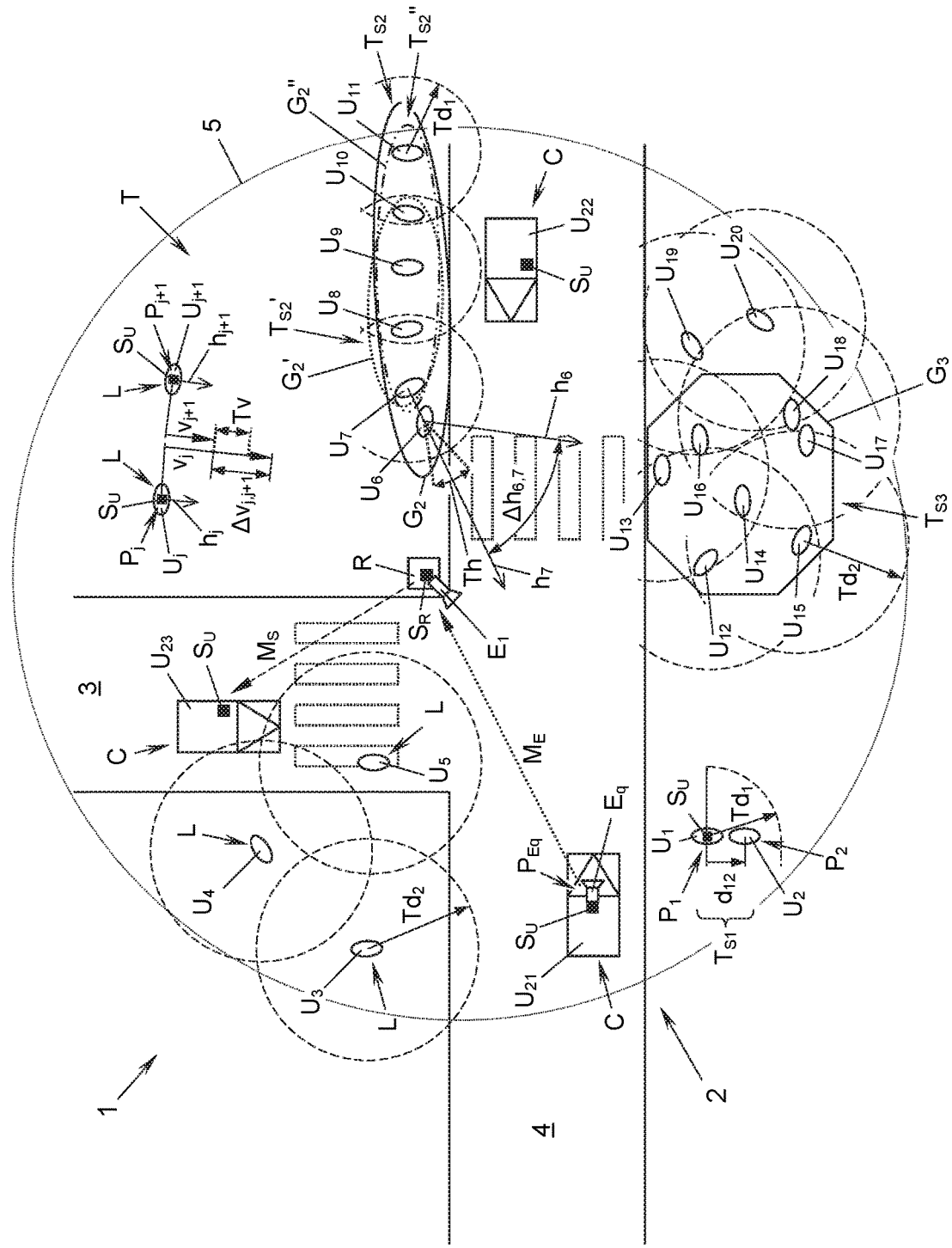

(51) Int. Cl.
  *G08G 1/0967* (2006.01)
  *G08G 1/056* (2006.01)
  *H04W 4/44* (2018.01)
  *H04W 4/40* (2018.01)
  *H04L 51/222* (2022.01)

(52) U.S. Cl.
  CPC ..... *G08G 1/096783* (2013.01); *H04L 51/222* (2022.05); *H04W 4/40* (2018.02); *H04W 4/44* (2018.02)

(56) References Cited

U.S. PATENT DOCUMENTS

| | | | |
|---|---|---|---|
| 2014/0191884 A1 | 7/2014 | Maeda et al. | |
| 2015/0010212 A1* | 1/2015 | Segarra | G08G 1/09626 382/104 |
| 2017/0365166 A1* | 12/2017 | Lu | G08G 1/0112 |
| 2018/0005525 A1* | 1/2018 | Parundekar | H04L 67/12 |
| 2018/0146471 A1* | 5/2018 | Xu | H04W 4/44 |
| 2019/0051151 A1* | 2/2019 | Mueck | G08G 1/0145 |
| 2019/0325751 A1* | 10/2019 | Altintas | H04W 4/44 |
| 2019/0327588 A1* | 10/2019 | Gong | H04W 4/44 |
| 2020/0017108 A1* | 1/2020 | Bae | H04W 4/44 |
| 2020/0139980 A1* | 5/2020 | Liu | H04L 63/1408 |
| 2020/0204952 A1* | 6/2020 | Sorrentino | H04W 4/027 |
| 2020/0326203 A1* | 10/2020 | Lund | G01C 21/3635 |
| 2021/0360571 A1* | 11/2021 | Hwang | H04W 64/00 |
| 2022/0208008 A1* | 6/2022 | Matsuoka | G08G 1/07 |

FOREIGN PATENT DOCUMENTS

| | | | | |
|---|---|---|---|---|
| CN | 112533174 A | * | 3/2021 | ........... G08G 1/0104 |
| DE | 112015000123 T5 | | 6/2016 | |
| WO | WO-2016206462 A1 | * | 12/2016 | .......... H04W 72/048 |

OTHER PUBLICATIONS

Office Action received for European Patent Application No. 19192996.7, dated Jun. 24, 2021, 6 pages.

* cited by examiner

SERVICE STATION FOR AN INTELLIGENT TRANSPORTATION SYSTEM

CROSS-REFERENCE TO RELATED APPLICATIONS

This application claims priority to European Patent Application No. 19 192 996.7, filed on Aug. 22, 2019, the entirety of which is incorporated herein by reference.

BACKGROUND

Technical Field

The disclosed subject matter relates to an Intelligent Transportation System (ITS) service station.

Background Art

For increasing road safety, a growing number of vehicles is equipped with an onboard ITS station which exchanges information via radio communication with other ITS stations in an ITS. The basic ITS communication architecture is described in ETSI (European Telecommunications Standards Institute) Standard ETSI EN 302 665 and related standards. According thereto, each ITS station repetitively transmits a status message comprising ITS station specific information. Moreover, each ITS station receives status messages repetitively sent by other ITS stations comprising their respective specific information. ITS stations at the roadside (Road Side Unit, RSU) generate and transmit further information and/or relay other ITS stations' information inside the ITS, e.g., to a central server thereof.

The messages are, e.g., Cooperative Awareness Messages (CAM) according to ETSI EN 302 637-2, comprising motion data of the vehicle transmitting the message, like position, speed and heading typically determined by ITS station sensors. In other cases the messages are Basic Safety Messages (BSM) according to the SAE International Standard J2735 BSM, which comprise additional (sensor) data, e.g., vehicle size, acceleration, brake state etc.

Particularly for autonomous driving environments it is also envisaged, e.g., in the SAE International Standard SAE J2945/9 that a vulnerable road user (VRU), i.e., a road user that is particularly vulnerable to injury, such as a pedestrian, a cyclist, a powered two wheeler (PTW) or an animal, carries an ITS station which repetitively transmits a VRU-specific status message, e.g., a Personal Safety Message (PSM).

However, not all road users, i.e. vehicles, VRUs etc., are actually equipped with an ITS station. To avoid that those unequipped road users remain unconsidered in the ITS such that safety might be compromised, it is envisaged to provide further sensors, e.g., lidar or radar sensor and/or a cameras, in the ITS. Each sensor may be carried by a vehicle, e.g., as part of the vehicles' ITS station, or mounted at the roadside and perceives other objects, particularly road users, including their respective geographical positions (and, optionally, further parameters) of each road user, and share their "perceptions", i.e., detections, analysis, trackings etc., with vehicles and infrastructure of the ITS by repetitively sending perception messages, e.g., Collective Perception Messages (CPM) according to the ETSI Technical Specification TS 103 324.

In areas with many road users, particularly many VRUs, e.g. around crowded road crossings or the like in a city, it becomes computationally complex to consider each road user individually, and inefficient to do so in each ITS station separately, particularly when many road users—at least during some time—move similarly, e.g., first wait for a green traffic light and then cross a road.

BRIEF SUMMARY

It is an object of the disclosed subject matter to increase efficiency in an ITS while achieving the desired safety requirements.

According to a first aspect, this object is achieved by an ITS service station which comprises:

a receiver configured to receive, from one or more sensors, information on a set of road users perceived by the sensors, wherein said road user information includes, for each road user in the set, a respective geographical position determined by the sensors;

a controller connected to the receiver and configured to determine, on the basis of said geographical positions, whether a subset of road users in said set meets a predetermined criterion of mutual proximity; and a transmitter connected to the controller and configured to transmit, when said subset comprises two or more road users, a service message indicative of said subset.

The disclosed subject matter is based on the finding that considering each individual in a group of road users which are in mutual proximity often does not add information shared in the ITS when compared to considering just the whole group as such. Hence, when a subset of two or more road users is determined, safety requirements are satisfied by considering the subset instead of each individual. The ITS service station provides the computationally complex service of determining the subset(s) and shares this information with ITS stations by transmitting the service message. This saves computational complexity in each ITS station receiving the status message and is more efficient than considering each road user separately. Thereby the efficiency of the ITS is increased.

In a beneficial embodiment of the ITS service station, said determining comprises calculating, from said geographical positions, distances between road users in the set, and said criterion comprises that the respective distance of a road user to each of a predetermined number of other road users in the set is smaller than a predetermined distance threshold. Thereby a very simple and efficient determination of the subset is achieved: The distance threshold determines the respective geographical distances between pairs of road users in the subset (in other words: the mutual proximity of the road users in the subset). The predetermined number specifies how many road users have to be within the distance; this can easily and efficiently be calculated.

Advantageously, said criterion further comprises that a time during which said distance has been smaller than the predetermined distance threshold exceeds a predetermined duration. Hence, road users that are close to each other for just a short moment (i.e., less than the predetermined duration), e.g., a vehicle driving past a pedestrian, are not in the same subset. Thereby, it is ensured that information which might be of some value in the ITS remains available, i.e., is not merged into a single subset.

In a further beneficial embodiment of the ITS service station, said determining further comprises calculating, from the road user information, heading differences between headings of road users in the set, and said criterion further comprises that the respective heading differences of the road user to each of the predetermined number of other road users in the set are smaller than a predetermined heading threshold. Alternatively or additionally, it is favourable when said determining further comprises calculating, from the road user information, speed differences between speeds of road users in the set, and when said criterion further comprises that the respective speed differences of the road user to each of the predetermined number of other road users in the set are smaller than a predetermined speed threshold.

Thereby, only those mutually proximate road users are in a subset that are heading in a similar direction (i.e., having a mutual heading difference below the heading threshold) and/or are moving at a similar speed (i.e., having a mutual speed difference below the speed threshold). On the other hand, road users that are heading in substantially different directions and/or are moving at substantially different speeds are not in the same subset even if they were in mutual proximity. In this case, it is also ensured that information on road users of different heading or speed remains available in the ITS, i.e., is not merged into a single subset, even if they are close to other road users.

In one embodiment, the respective heading and/or the speed of the ITS stations may be included in said road user information. Advantageously, however, the controller is configured to determine the heading and/or the speed of each road user from the geographical positions included in road user information successively received from the one or more sensors by the receiver. In this case, the determination of the heading and/or of the speed is "centralised" at the ITS service station. Hence, both the road user information and the sensor may be particularly simple which helps further increasing the efficiency of the ITS, particularly when several sensors are involved.

Coming back to said predetermined number of other ITS stations, any number may be predetermined. In a favourable variant, said predetermined number is one. By requiring only one nearby road user, i.e., one other road user within the distance threshold, to form a subset, the probability of determining—at least small—subsets increases, such that the potential of—at least small—gains in efficiency is high. In an alternative variant, said predetermined number is three. Hence, each road user requires at least three nearby road users. While, in this case, the probability of determining a subset is lower than in the aforementioned variant, all road users in a subset are, generally, in a closer geographical area (depending on said distance threshold), which helps achieving particularly high safety requirements.

Each subset may be indicated by single geographical position representative of the road users in the subset, e.g., a central position. It is advantageous, however, when said service message comprises a geographical area which includes the geographical positions of the road users in the subset and excludes the geographical positions of other road users of the set. In this variant, ambiguities are precluded as said geographical area comprises the geographical positions of all road users in the subset. Moreover, each ITS station which receives the service message merely has to consider the subset like a single road user in said geographical area.

The service message may be any type of message, e.g., a specific, non-standard message, or a standard message, e.g., a Cooperative Awareness Messages (CAM) according to the ETSI Technical Specification TS 102 637 or Basic Safety Messages (BSM) according to the SAE International Standard J2735 BSM. In a favourable embodiment, the service message is a Collective Perception Message (CPM) according to the ETSI Technical Specification TS 103 324. Thereby, a strict compliance with ITS standards is achieved and the radio channel is not loaded with extra messages.

Each sensor may be fixedly mounted at any suitable position, or may be carried by a vehicle, e.g., as part of a vehicle's ITS station. It is advantageous, however, when at least one of said sensors is comprised by the ITS service station and is connected to the receiver. Thereby, the receiver merely has to forward the road user information to the controller and radio channel capacity used for radio-transmitting road user information from remote sensors to the receiver of the ITS service station can be saved.

While the ITS service station may be of any type, including a movable ITS service station, it is particularly advantageous when the ITS service station is a roadside unit (RSU). Thereby, the ITS service station is stationary and provides its service to the (moving) ITS stations. It may be positioned at a crucial geographical point, e.g., a road intersection, such that a reliable service is permanently ensured there. Alternatively, it may be positioned remotely and communicate to ITS stations via the ITS infrastructure.

BRIEF DESCRIPTION OF THE DRAWINGS/FIGURES

Figure 2:
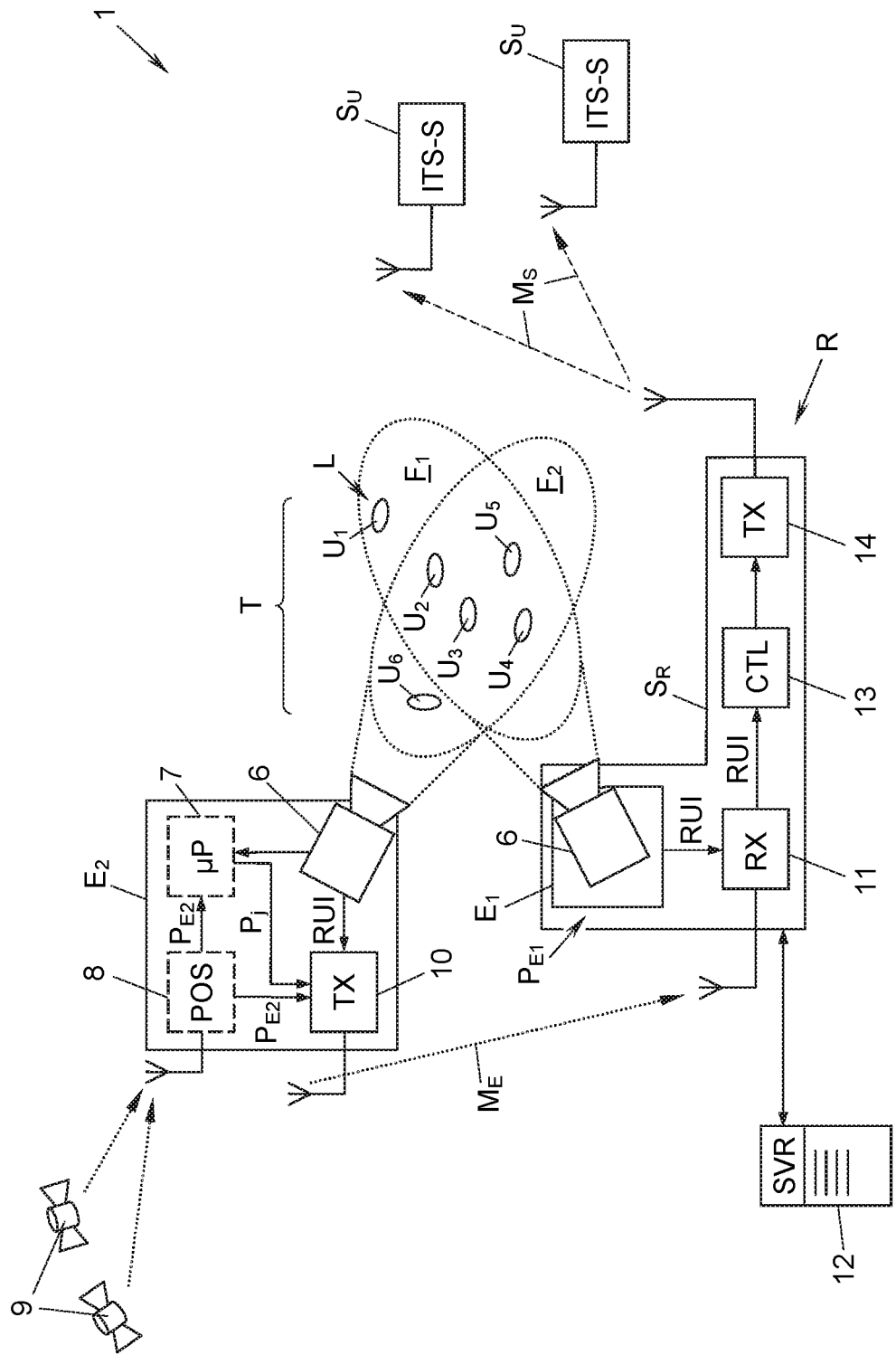

The disclosed subject matter will now be described in further detail by means of exemplary embodiments thereof under reference to the enclosed drawings, in which:

FIG. 1 shows a section of an Intelligent Transportation System (ITS) with an ITS service station according to the disclosed subject matter and a multitude of road users on a road intersection in a plan view; and FIG. 2 shows the ITS according to FIG. 1 in a schematic block diagram.

DETAILED DESCRIPTION

FIG. 1 shows a section of an Intelligent Transportation System (ITS) 1 at an intersection 2 of two roads 3 and 4. On or alongside the roads 3 and 4 are road users $U_1, U_2, \ldots$, generally $U_j$, e.g., vehicles C and/or Vulnerable Road Users (VRUs) L and a stationary roadside unit (RSU) R. At least one (here: all) vehicles C carry a respective ITS station $S_U$ of the ITS 1. Similarly, VRUs L, e.g., the VRUs denominated as road users $U_j, U_{j+1}$, optionally carry a respective ITS station $S_U$. A VRU ITS station $S_U$ may be integrated in a personal digital assistant, e.g., a smartphone. Moreover, the RSU R is an ITS service station $S_R$ of the ITS 1; in other embodiments, the ITS service station $S_R$ may be movable, e.g., onboard a vehicle C or carried by a VRU L. In the example of FIG. 1, all VRUs L are pedestrians; in other cases, at least one VRU L could be a cyclist, a powered two wheeler (PTW), an animal or the like.

A set T of road users $U_j$ is composed of at least some of the vehicles C and/or VRUs L (here: all VRUs L) that are within an area 5 to be considered. In the example of FIG. 1, the area 5 is a surrounding area of the ITS service station $S_R$; in other examples, the ITS service station $S_R$ could be remote from the area 5.

In the area 5, there are one or more sensors $E_1, E_2, \ldots$, generally $E_q$, each of which is configured to perceive road users $U_j$ in the sensor's environment, i.e., to detect and locate road users $U_j$ that are separate from the sensor $E_q$. Each sensor $E_q$ is either fixedly mounted, e.g., alongside the roads 3, 4, or is carried by one of the road users $U_j$, e.g., as part of the vehicle's or VRU's ITS station $S_U$ as depicted for the road user $U_{21}$ in FIG. 1. However, each sensor $E_q$ has its respective sensor position $P_{Eq}$ which is variable in some cases.

On the basis of the example of FIG. 2, details on the sensors $E_q$ and the ITS service station $S_R$ shall now be explained.

Each sensor $E_q$ comprises a camera 6 with an image processor and/or a Lidar or Radar device or the like. The camera 6 is used to repetitively perceive road users $U_j$ (in the example of FIG. 2 VRUs L denominated as road users $U_1$ to $U_6$) in a viewing range $F_q$ (not depicted in FIG. 1 for visibility reasons) of the sensor $E_q$. The perceiving includes locating the road users $U_j$, as known in the art. For said locating, the sensor $E_q$ determines the respective geographical position $P_1$, $P_2$, . . . , generally $P_j$, of each road user $U_j$. This determination may be executed relative to the senor's position $P_{Eq}$, e.g., using an optional processor 7 of the sensor $E_q$. Optionally, the sensor $E_q$ may also determine, e.g., by means of the processor 7, a heading $h_j$ and/or a speed $v_j$ (FIG. 1) of each perceived road user $U_j$, e.g., from the evolution of geographical positions $P_j$ successively determined for the road user $U_j$.

FIG. 2 shows the optional case, in which one sensor $E_q$ (here: the sensor $E_1$) is comprised by the ITS service station $S_R$. When the sensor $E_q$ is fixedly mounted, e.g., as part of an RSU ITS service station $S_R$, the sensor position $P_{Eq}$ may be predetermined and known to the sensor $E_q$. Alternatively, particularly when the sensor $E_q$ is movable, the sensor $E_q$ optionally includes a position sensor 8 which is configured to repetitively determine the geographical position $P_{Eq}$ of the sensor $E_q$, e.g., of the sensor $E_2$ in this example. To this end, the position sensor 8 locates itself, e.g., by means of satellites 9 of a Global Navigation Satellite System (GNSS), e.g., GPS, Galileo, Glonass etc.; other ways of determining the sensor position $P_{Eq}$ are known in the art, e.g., by means of triangulation in a cellular network etc., and may be applied.

When not comprised by the ITS service station $S_R$, the sensor $E_q$ has a transmitter 10 for repetitively transmitting a sensor message $M_E$, e.g., a Collective Perception Message (CPM) according to the ETSI Technical Specification TS 103 324, comprising road user information RUI on the road users $U_j$ repetitively perceived by the sensor $E_q$ to the ITS service station $S_R$. The road user information RUI includes the respective geographical position $P_j$ of each perceived road user $U_j$. When comprised by the ITS service station $S_R$, the transmitter 10 of the sensor $E_q$ is not necessary.

The sensor messages $M_E$ (and the road user information RUI comprised therein) are received by a receiver 11 of the ITS service station $S_R$ which is connected to a central server 12 of the ITS 1. The receiver 11 also receives road user information RUI from the sensor $E_1$ which is comprised by the ITS service station $S_R$ and is connected, e.g., wire-connected, to the receiver 11.

The ITS service station $S_R$ has a controller 13 which is connected to the receiver 11 and has access to the geographical positions $P_j$ included in the road user information RUI. When different sensors $E_q$ provide road user information RUI on road users $U_j$ in their respective viewing range $F_q$, road user information RUI will generally be overlapping due to generally overlapping viewing ranges $F_q$ of the sensors $E_q$; this is shown for the viewing range $F_1$ of the sensor $E_1$, in which the road users $U_1$ to $U_5$ are located, in comparison with the viewing range $F_2$ of the sensor $E_2$, in which the road users $U_2$ to $U_6$ are located. In this case, the controller 13 may aggregate the road user information RUI received from different sensors $E_q$ to achieve road user information RUI comprising the set T of road users $U_j$.

On the basis of the geographical positions $P_j$ of the perceived road users $U_j$, the controller 13 of the ITS service station $S_R$ determines whether at least one subset $T_{S1}$, $T_{S2}$, . . . , generally $T_{Sk}$ (FIG. 1), in said set T of road users $U_j$ exists, in which subset $T_{Sk}$ the road users $U_j$ meet a predetermined criterion of mutual proximity. Details and variants of this determination and the criterion will be exemplified with respect to FIG. 1 further below.

The ITS service station $S_R$ further comprises a transmitter 14 which is connected to the controller 13 and, when the controller 13 has determined at least one subset $T_{Sk}$ of two or more road users $U_j$, transmits, to ITS stations $S_U$ in the ITS 1, a service message $M_S$ which is indicative of the (at least one) determined subset $T_{Sk}$. In case the controller 13 has determined more than one subset $T_{Sk}$, the transmitter 14 of the ITS service station $S_R$ may transmit a single service message $M_S$ indicative of all subsets $T_{Sk}$ or a separate service message $M_S$ for one or more of the subsets $T_{Sk}$. To this end, the service message $M_S$ may be of any suitable format; in the present example, the service message $M_S$ is a Collective Perception Messages (CPM) according to the ETSI Technical Specification TS 103 324.

Each ITS station $S_U$ may, upon reception of the service message $M_S$, consider each subset $T_{Sk}$ of road users $U_j$ as a single group comparable to a single road user $U_j$ instead of considering each individual road user $U_j$ of the subset $T_{Sk}$ separately, thereby saving computational complexity in the ITS 1.

For being indicative of the subset $T_{Sk}$, the service message $M_S$ may, in one embodiment, comprise a respective geographical area $G_1$, $G_2$, . . . , generally $G_k$, (FIG. 1) for each determined subset $T_{Sk}$. The area $G_k$ includes the geographical positions $P_j$ of the road users $U_j$ in the respective subset $T_{Sk}$. To this end, the geographical area $G_k$ may be specified by a surrounding circle, ellipse, polygon or the like. However, the geographical area $G_k$ excludes geographical positions $P_j$ of road users $U_j$ which are not in the respective subset $T_{Sk}$.

Returning to FIG. 1, it shall now be explained on the basis of different examples depicted therein how the controller 13 of the ITS service station $S_R$ determines the subset $T_{Sk}$. While the examples of FIG. 1 refer to VRUs L, it shall be understood that the same can be applied to road users $U_j$ of any type.

Generally, said determining comprises calculating distances $d_{j,j+1}$ between geographical positions $P_j$ (not indicated for each road user $U_j$ in FIG. 1) of different pairs of road users $U_j$ in the set T. In the example of FIG. 1, the distance $d_{12}$ between the geographical positions $P_1$, $P_2$ of the road users $U_1$, $U_2$ is low. It is understood that this distance $d_{12}$ is equal to a distance $d_{21}$—measured in the other direction—between the same road users $U_1$, $U_2$. Hence, not all permutations of distances $d_{j,j+1}$ have to be calculated in the ITS service station $S_R$. Moreover, some distances, e.g., the distance $d_{1,11}$ between the road users $U_1$, $U_{11}$ in the example of FIG. 1, which is substantially larger, may be excluded from calculation beforehand on the basis of, e.g., segmentation of the ITS 1 into geographical or logical segments and their proximity.

In this example, the aforementioned criterion is that the respective distance of a road user $U_j$ to each of a predetermined number of other road users $U_j$ in the set T is smaller than a predetermined distance threshold $Td_1$ (or $Td_2$). In other words, a geographical density of road users $U_j$ is evaluated. The distance threshold $Td_1$, $Td_2$ may range, e.g., from less than a meter to a few meters and optionally depends on said predetermined number and/or the specific environment of the ITS service station $S_R$.

Said predetermined number may be any number. In one embodiment, the predetermined number is "one" such that any two road users $U_j$, $U_{j+1}$ the distance $d_{j,j+1}$ between which is below the distance threshold (here: a first distance threshold) $Td_1$ form a subset $T_{Sk}$. This criterion is met, e.g., by the road users $U_1$, $U_2$ ($d_{12}<Td_1$) forming a first subset $T_{S1}$ in the example of FIG. 1.

The criterion is also met by the road users $U_6$ to $U_{11}$ which are in a row, one behind the other, in the example of FIG. 1, as can be seen by the circles respectively drawn around the road users $U_7$, $U_9$, $U_{11}$ and having radii according to the distance threshold $Td_1$. Hence, the road users $U_6$ to $U_{11}$ form another subset $T_{S2}$ indicated by an ellipsoid geographical area $G_2$. The road users $U_7$ to $U_{10}$ of this subset $T_{S2}$ would, however, also meet the criterion if the predetermined number was "two" instead of "one", thus forming a subset $T_{S2}'$ (indicated by a dotted line of the geographical area $G_2'$).

The road users $U_{12}$ to $U_{20}$ in FIG. 1 depict a different embodiment in which the predetermined number is "three". In this case, also the distance threshold (referenced as a second distance threshold) $Td_2$ is optionally predetermined to be different from—particularly larger than in—the case described above. In this example, the respective distances $d_{j,j+1}$, $d_{j,j+2}$, $d_{j,j+3}$, of each of the road users $U_{12}$ to $U_{18}$ to each of three other road users $U_{j+1}$, $U_{j+2}$, $U_{j+3}$ in the set T is smaller than the predetermined distance threshold $Td_2$ represented by the circles respectively drawn around the road user $U_j$. Thereby, the road users $U_{12}$ to $U_{18}$ form a further subset $T_{S3}$ which is indicated by a polygonal geographical area $G_3$.

On the other hand, the road users $U_{19}$ and $U_{20}$ are not in the subset $T_{S3}$, as each of them has only two nearby, i.e., closer than the distance threshold $Td_2$, road users. In the case of the road users $U_{19}$ these are the road users $U_{16}$ and $U_{20}$ and in case of the road user $U_{20}$ the road users $U_{18}$ and $U_{19}$.

The road users $U_3$, $U_4$, $U_5$ are even further apart from each other such that they do not form a subset $T_{Sk}$.

It shall be understood that other ways of determining a geographical density of road users $U_j$ may be applied by the controller 13 of the ITS service station $S_R$.

The aforementioned criterion optionally comprises further aspects. For example, the ITS service station $S_R$ may, in one embodiment, additionally consider temporal changes in the mutual proximity of road users $U_j$. In this case, the criterion comprises that a time during which said distance $d_{j,j+1}$ has been smaller than the predetermined distance threshold $Td_1$, $Td_2$ exceeds a predetermined duration. Hence, road users $U_j$ which have been in mutual proximity for only a short moment, i.e., for a time shorter than the predetermined duration, are not in the same subset $T_{Sk}$. Said time may, e.g., be derived from road user information RUI repetitively received in the ITS service station $S_R$ from the sensors $E_q$. The predetermined duration is, e.g., between a few hundred milliseconds and a few seconds, particularly, about one second.

FIG. 1 depicts an alternative or additional optional embodiment in which also headings $h_1$, $h_2$, . . . , generally $h_j$, and/or speeds $v_1$, $v_2$, . . . , generally $v_j$, of road users $U_j$ (here: again depicted only for VRUs L) are considered. As shown for the road users denoted $U_j$ and $U_{j+1}$ in FIG. 1, each road user $U_j$, $U_{j+1}$ has its respective heading $h_j$, $h_{j+1}$ and speed $v_j$, $v_{j+1}$. Therefrom, respective speed differences $\Delta v_{j,j+1}$ between the speeds $v_j$, $v_{j+1}$ of road users $U_j$, $U_{j+1}$ in the set T and/or respective heading differences $\Delta h_{j,j+1}$ between headings $h_j$, $h_{j+1}$ of road users $U_j$, $U_{j+1}$ in the set T (shown for the headings $h_6$, $h_7$ of the road users $U_6$ and $U_7$ in FIG. 1) are calculated by the controller 13 of the ITS service station $S_R$, when determining whether a subset $T_{Sk}$ of road users $U_j$ in said set T meets the predetermined criterion of mutual proximity. In this embodiment, said criterion further comprises that the respective heading differences $\Delta h_{j,j+1}$ of the road user $U_j$ to each of the predetermined number of other road users $U_{j+1}$ in the set T is smaller than a predetermined heading threshold Th, and/or that the respective speed differences $\Delta v_{j,j+1}$ of the road user $U_j$ to each of the predetermined number of other road users $U_{j+1}$ in the set T is smaller than a predetermined speed threshold Tv.

In the example of FIG. 1, the heading difference $\Delta h_{6,7}$ of the headings $h_6$ and $h_7$ of the road user $U_6$ to the road user $U_7$ is not smaller than the predetermined heading threshold Th. This is why the road user $U_6$, in spite of being nearby the road user $U_7$, is not in a subset $T_{S2}''$ (indicated by a broken line of a geographical area $G_2''$). Similarly, the speed difference $\Delta v_{j,j+1}$ of the road user $U_j$ to the road user $U_{j+1}$ in FIG. 1 exceeds the speed threshold Tv; hence, the road users $U_j$ and $U_{j+1}$ in FIG. 1 cannot form a subset $T_{Sk}$ even if they were in close proximity.

The predetermined heading threshold Th is, e.g., between a few degrees and about 60 degrees, particularly about 30 degrees; the predetermined speed threshold Tv is, e.g., in the range of a few kilometers per hour. The speed threshold Tv optionally depends on the speed $v_j$ of the respective road users $U_j$, such that at lower speed $v_j$ the speed threshold Tv is predetermined to be lower; the same may apply to the heading threshold Th. Moreover, the heading and/or speed differences $\Delta h_{j,j+1}$, $\Delta v_{j,j+1}$ may optionally be calculated between an heading $h_j$ and/or speed $v_j$ of a road user $U_j$ and an average heading and/or an average speed, respectively, of the road users $U_j$ of the subset $T_{Sk}$.

The heading $h_j$ and/or the speed $v_j$ of each road user $U_j$ may be included in the road user information RUI. Alternatively, the controller 13 may be configured to determine the heading $h_j$ and/or the speed $v_j$ of each road user $U_j$ from the geographical positions $P_j$ included in road user information RUI which the ITS service station $S_R$ successively received from the sensors $E_q$.

CONCLUSION

The disclosed subject matter is not restricted to the specific embodiments described in detail herein, but encompasses all variants, modifications and combinations thereof that fall within the scope of the appended claims.

What is claimed is:

1. An Intelligent Transportation System (ITS) service station, comprising:
   a receiver configured to receive, from one or more sensors, road user information on a set of road users perceived by the sensors, wherein said road user information includes, for each road user in the set, a respective geographical position determined by the sensors;
   a controller connected to the receiver and configured to determine, on the basis of said geographical positions, whether a subset of road users in said set meets a predetermined criterion of mutual proximity, the determination of whether the subset of road users in said set meets the predetermined criterion of mutual proximity comprising:
     calculating, from said geographical positions, distances between road users in the set, and wherein said criterion comprises that a respective distance of a road user to each of a predetermined number of other road users in the set is smaller than a predetermined distance threshold, and
     calculating, from the road user information, heading differences between headings of road users in the set, and wherein said criterion further comprises that the respective heading differences of the road user to each of the predetermined number of other road users in the set are smaller than a predetermined heading threshold; and a transmitter connected to the controller and configured to transmit, when said subset comprises two or more road users, a service message indicative of said subset.

2. The ITS service station according to claim 1, wherein said criterion further comprises that a time during which said respective distance has been smaller than the predetermined distance threshold exceeds a predetermined duration.

3. The ITS service station according to claim 1, wherein said determining further comprises calculating, from the road user information, speed differences between speeds of road users in the set, wherein said criterion further comprises that the respective speed differences of the road user to each of the predetermined number of other road users in the set are smaller than a predetermined speed threshold, and wherein the controller is configured to determine at least one of a heading and a speed of each road user from the geographical positions included in road user information successively received from the one or more sensors by the receiver.

4. The ITS service station according to claim 1, wherein said predetermined number is one.

5. The ITS service station according to claim 1, wherein said predetermined number is three.

6. The ITS service station according to claim 1, wherein said service message comprises a geographical area which includes the geographical positions of the road users in the subset and excludes the geographical positions of other road users of the set.

7. The ITS service station according to claim 1, wherein the service message is a Collective Perception Message (CPM).

8. The ITS service station according to claim 1, wherein at least one of said sensors is comprised by the ITS service station and is connected to the receiver.

9. The ITS service station according to claim 1, wherein the ITS service station is a roadside unit (RSU).

10. An Intelligent Transportation System (ITS) service station, comprising:
a receiver configured to receive, from one or more sensors, road user information on a set of road users perceived by the sensors, wherein said road user information includes, for each road user in the set, a respective geographical position determined by the sensors;
a controller connected to the receiver and configured to determine, on the basis of said geographical positions, whether a subset of road users in said set meets a predetermined criterion of mutual proximity, the determination of whether the subset of road users in said set meets the predetermined criterion of mutual proximity comprising:
calculating, from said geographical positions, distances between road users in the set, and wherein said criterion comprises that a respective distance of a road user to each of a predetermined number of other road users in the set is smaller than a predetermined distance threshold, and
calculating, from the road user information, speed differences between speeds of road users in the set, and wherein said criterion further comprises that the respective speed differences of the road user to each of the predetermined number of other road users in the set are smaller than a predetermined speed threshold; and
a transmitter connected to the controller and configured to transmit, when said subset comprises two or more road users, a service message indicative of said subset.

11. The ITS service station according to claim 10, wherein said criterion further comprises that a time during which said respective distance has been smaller than the predetermined distance threshold exceeds a predetermined duration.

12. The ITS service station according to claim 10, wherein said predetermined number is one.

13. The ITS service station according to claim 10, wherein said predetermined number is three.

14. The ITS service station according to claim 10, wherein said service message comprises a geographical area which includes the geographical positions of the road users in the subset and excludes the geographical positions of other road users of the set.

15. The ITS service station according to claim 10, wherein the service message is a Collective Perception Message (CPM).

16. The ITS service station according to claim 10, wherein at least one of said sensors is comprised by the ITS service station and is connected to the receiver.

17. The ITS service station according to claim 10, wherein the ITS service station is a roadside unit (RSU).

* * * * *